J. Brodie.
Lathe Chuck.
N°. 93,801.  Patented Aug. 17, 1869.
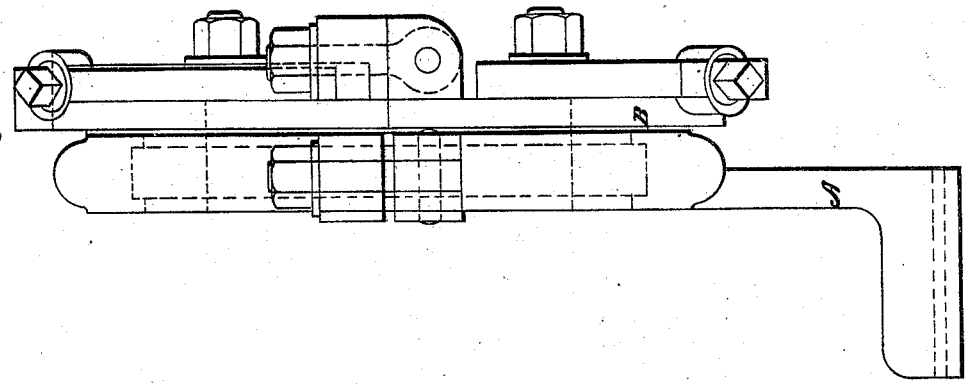
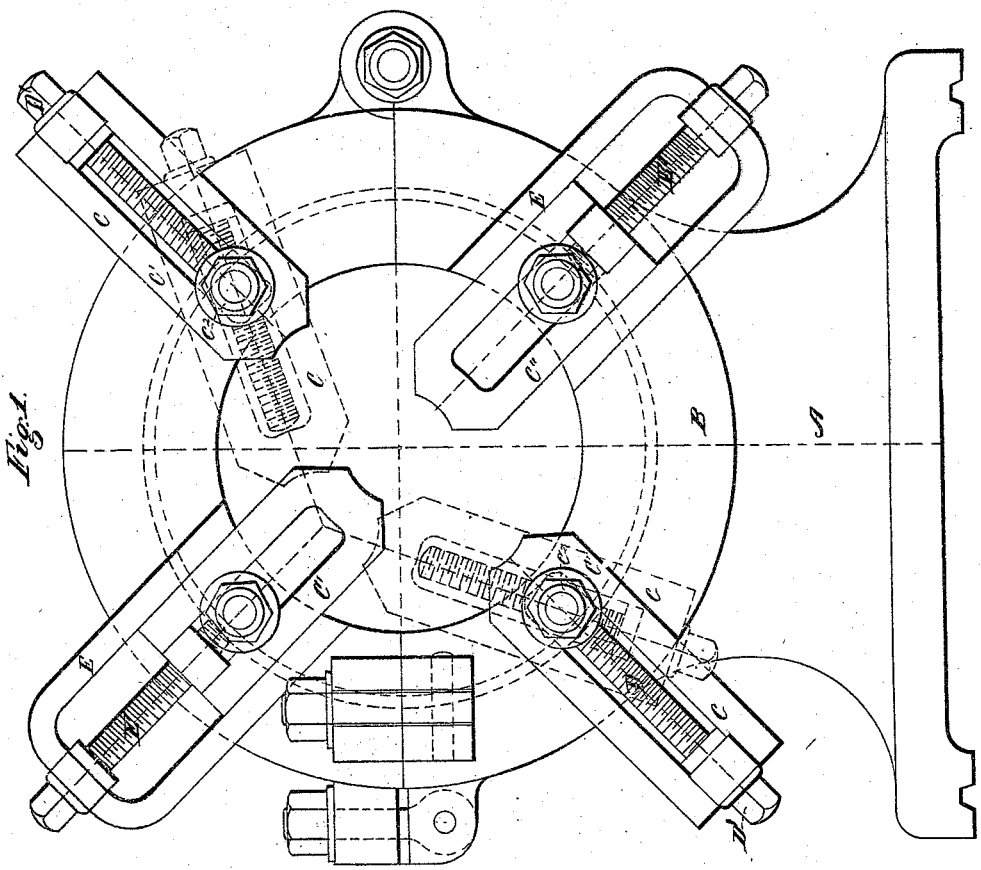
Witnesses:
W. J. McConnell
W. P. Buswell
Inventor:
James Brodie

United States Patent Office.

JAMES BRODIE, OF SAN FRANCISCO, CALIFORNIA.

Letters Patent No. 93,801, dated August 17, 1869.

IMPROVED STEADY-REST FOR LATHES.

The Schedule referred to in these Letters Patent and making part of the same.

*To all whom it may concern:*

Be it known that I, JAMES BRODIE, of the city and county of San Francisco, State of California, have invented a new and improved Lathe-Rest; and I hereby declare that the following is a full, clear, and exact description of the same, reference being had to the accompanying drawing, which forms a part of this specification.

In the drawings—

Figure 1 is a front elevation, and

Figure 2, a side elevation.

To enable others skilled in the art to make and use my invention, I will proceed to describe fully its construction and operation.

A represents a stand or steady-rest, provided with a circular orifice, in which is attached the annular plate B, in such manner as to revolve freely.

The plate B is provided with the adjustable dogs C C and C' C', the two former of which consist of the slotted strips $c^1$, pivoted to the plate B by nuts, which are provided with projections having screw-threads, on which the nuts $c^2$ are screwed, and hold the dog in position.

D D represent screw-bolts, which pass through the outer ends of the dogs C, and longitudinally through the slots and pivoting-nuts therein, and are provided with the square heads D'.

The dogs C' are similar in shape to the others, and are situated within the yokes or guides E, and slide freely thereon.

The screw-bolts E' pass through the outer ends of the guides E, being journalled therein, and passing from thence through the outer ends of the dogs C', terminate at the centre of the slots, instead of passing through the pivoting-bolt, as in the former case.

The dogs C C are situated directly opposite each other, as are also the dogs C' C'. By this method the dogs are easily adjusted to the work, by turning the bolts, which are provided with square heads.

When it is desired to hold the blank in an eccentric manner, the dogs C C, which are pivoted for the purpose, are swung to one side, as shown by dotted lines in fig. 1, and the dogs C' C' so regulated as to form a suitable eccentric bearing.

I am aware that the use of a revolving-rest, journalled in an upright steady-rest, is not new, neither do I desire to claim the idea in itself, as the patent of E. S. Gardner, September 1, 1857, shows a similar device; but What I do claim as new, and desire to secure by Letters Patent, is—

The dogs C C and C' C', arranged and operated as described, in combination with the revolving plate B, substantially as described.

JAS. BRODIE.

Witnesses:
 W. J. McCONNELL,
 W. F. BUSWELL.